(12) United States Patent
Jain

(10) Patent No.: US 12,242,871 B2
(45) Date of Patent: Mar. 4, 2025

(54) SOFTWARE DEFINED ANOMALY DETECTION FOR WORKLOADS

(71) Applicant: SAP SE, Walldorf (DE)

(72) Inventor: Shashank Mohan Jain, Bangalore (IN)

(73) Assignee: SAP SE, Walldorf (DE)

( * ) Notice: Subject to any disclaimer, the term of this patent is extended or adjusted under 35 U.S.C. 154(b) by 422 days.

(21) Appl. No.: 17/454,132

(22) Filed: Nov. 9, 2021

(65) Prior Publication Data
US 2023/0145484 A1 May 11, 2023

(51) Int. Cl.
| | |
|---|---|
| *G06F 9/455* | (2018.01) |
| *G06F 8/60* | (2018.01) |
| *G06F 11/30* | (2006.01) |
| *G08B 21/18* | (2006.01) |
| *H04L 43/16* | (2022.01) |
| *H04L 67/10* | (2022.01) |

(52) U.S. Cl.
CPC ............ *G06F 9/45533* (2013.01); *G06F 8/60* (2013.01); *G06F 9/455* (2013.01); *G06F 9/45558* (2013.01); *G06F 11/30* (2013.01); *G06F 11/3003* (2013.01); *G06F 11/3065* (2013.01); *G06F 11/3072* (2013.01); *G08B 21/182* (2013.01); *H04L 43/16* (2013.01); *G06F 2009/45587* (2013.01); *H04L 67/10* (2013.01)

(58) Field of Classification Search
CPC .. G06F 9/455; G06F 9/45533; G06F 9/45558; G06F 11/30; G06F 11/3003; G06F 11/3065; G06F 11/3072; G06F 2009/45587; G06F 2009/45595
See application file for complete search history.

(56) References Cited

U.S. PATENT DOCUMENTS

| | | | |
|---|---|---|---|
| 9,165,142 B1* | 10/2015 | Sanders | H04L 63/1416 |
| 2018/0260237 A1* | 9/2018 | Noll | G06F 11/1446 |
| 2018/0309770 A1* | 10/2018 | Han | G06N 20/00 |
| 2019/0098022 A1* | 3/2019 | Khurana | H04L 63/0245 |
| 2019/0102717 A1* | 4/2019 | Wu | H04L 41/147 |
| 2022/0342868 A1* | 10/2022 | Gonzalez Macias | G06F 16/285 |

* cited by examiner

*Primary Examiner* — Charles M Swift
(74) *Attorney, Agent, or Firm* — Buckley, Maschoff & Talwalkar LLC

(57) ABSTRACT

A system may include a virtual machine, of a cloud computing environment, that executes a target application workload to be intercepted. A software defined anomaly detection engine (that is separate from the target application workload and that is also executing in the virtual machine) may intercept the target application workload. A computer processor of the software defined anomaly detection engine may intercept network traffic that is external to the virtual machine and associated with the target application workload. The software defined anomaly detection engine may then automatically execute an anomaly detection algorithm in substantially real time on the intercepted network traffic to generate an intercept result. An anomaly detection alert signal may be transmitted based on a comparison of the intercept result and an anomaly threshold value.

16 Claims, 14 Drawing Sheets

SOFTWARE DEFINED ANOMALY DETECTION FOR WORKLOADS

BACKGROUND

An enterprise may use on-premises systems and/or a cloud computing environment to run applications and/or to provide services. For example, cloud-based applications may be used to process purchase orders, handle human resources tasks, interact with customers, etc. Moreover, a cloud computer environment may provide for an automating deployment, scaling, and management of Software-as-a-Service ("SaaS") applications. As used herein, the phrase "SaaS" may refer to a software licensing and delivery model in which software may be licensed on a subscription basis and be centrally hosted (also referred to as on-demand software, web-based or web-hosted software). Note that a "SaaS" application might also be associated with Infrastructure-as-a-Service ("IaaS"), Platform-as-a-Service ("PaaS"), Desktop-as-a-Service ("DaaS"), Managed-Software-as-a-Service ("MSaaS"), Mobile-Backend-as-a-Service ("MBaaS"), Datacenter-as-a-Service ("DCaaS"), Information-Technology-Management-as-a-Service ("ITMaaS"), etc. A multi-tenant cloud computing environment may execute such applications for a variety of different customers or tenants.

An application may be associated with time-series data that contains sequential data points (e.g., data values) that are observed at successive time durations (e.g., hourly, daily, weekly, monthly, annually, etc.). For example, monthly rainfall, daily stock prices, annual sales revenue, etc., are examples of time-series data. An algorithm may observe historical values of time-series data and detect anomalies in current time-series data. For example, the algorithm might detect an unusually high (or low) number of hits for an application. As used herein, the term "anomaly" (also referred to as an outlier) may refer to a data point (single instance or a few instances) which significantly differs in value from values of a normal pattern of data. Causes of anomalies often include unexpected changes to the data or the conditions surrounding the data. For example, a breakdown of a machine, an unexpected rise in temperature, an unexpected weather event, etc.

In some cases, a cloud provider will want to detect anomalies in applications that are currently executing. For example, the provider might restart an application or provide additional computing resources to the application when an anomaly is detected to improve performance. It therefore may be desirable to automatically detect anomalies for cloud computing environment workloads in an efficient and accurate manner.

SUMMARY

According to some embodiments, methods and systems may facilitate software defined anomaly detection for cloud computing environment workloads in an efficient and accurate manner. The system may include a virtual machine, of a cloud computing environment, that executes a target application workload to be intercepted. A software defined anomaly detection engine (that is separate from the target application workload and that is also executed in the virtual machine) may intercept the target application workload. A computer processor of the software defined anomaly detection engine may intercept network traffic that is external to the virtual machine and associated with the target application workload. The software defined anomaly detection engine may then automatically execute an anomaly detection algorithm in substantially real time on the intercepted network traffic to generate an intercept result. An anomaly detection alert signal may be transmitted based on a comparison of the intercept result and an anomaly threshold value.

Some embodiments comprise: means for arranging for a virtual machine of the cloud computing environment to execute a target application workload to be intercepted; means for intercepting, by a computer processor of a software defined anomaly detection engine separate from the target application workload that is also executing in the virtual machine to intercept the target application workload, network traffic that is external to the virtual machine and associated with the target application workload; means for automatically executing an anomaly detection algorithm in substantially real time on the intercepted network traffic to generate an intercept result; and means for transmitting an anomaly detection alert signal based on a comparison of the intercept result and an anomaly threshold value.

Some technical advantages of some embodiments disclosed herein are improved systems and methods associated with software defined anomaly detection for cloud computing environment workloads in an efficient and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
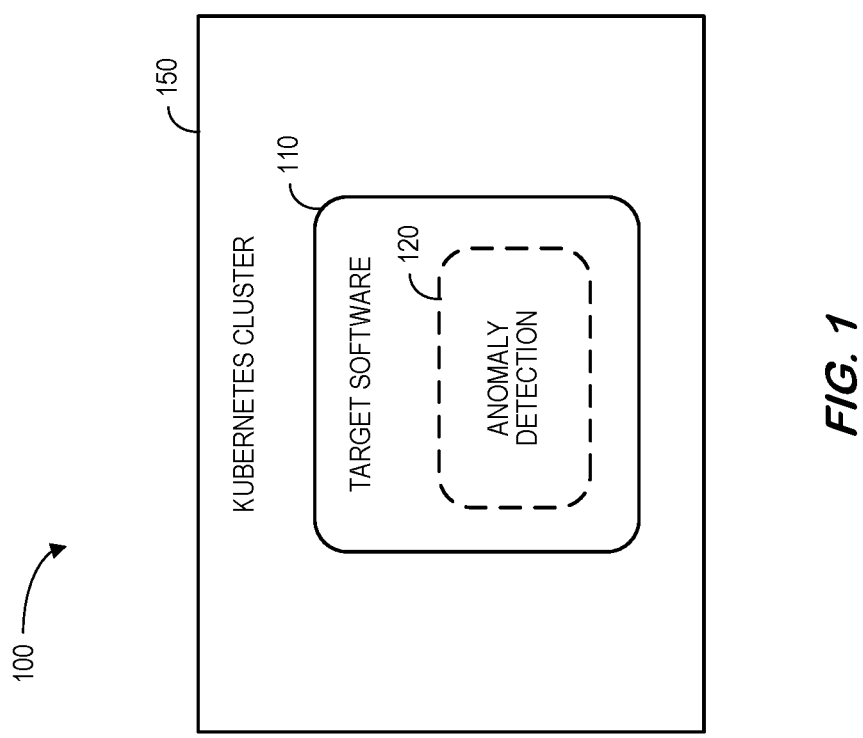
FIG. 1 is one typical approach to anomaly detection in a cloud computing environment.
Figure 2:
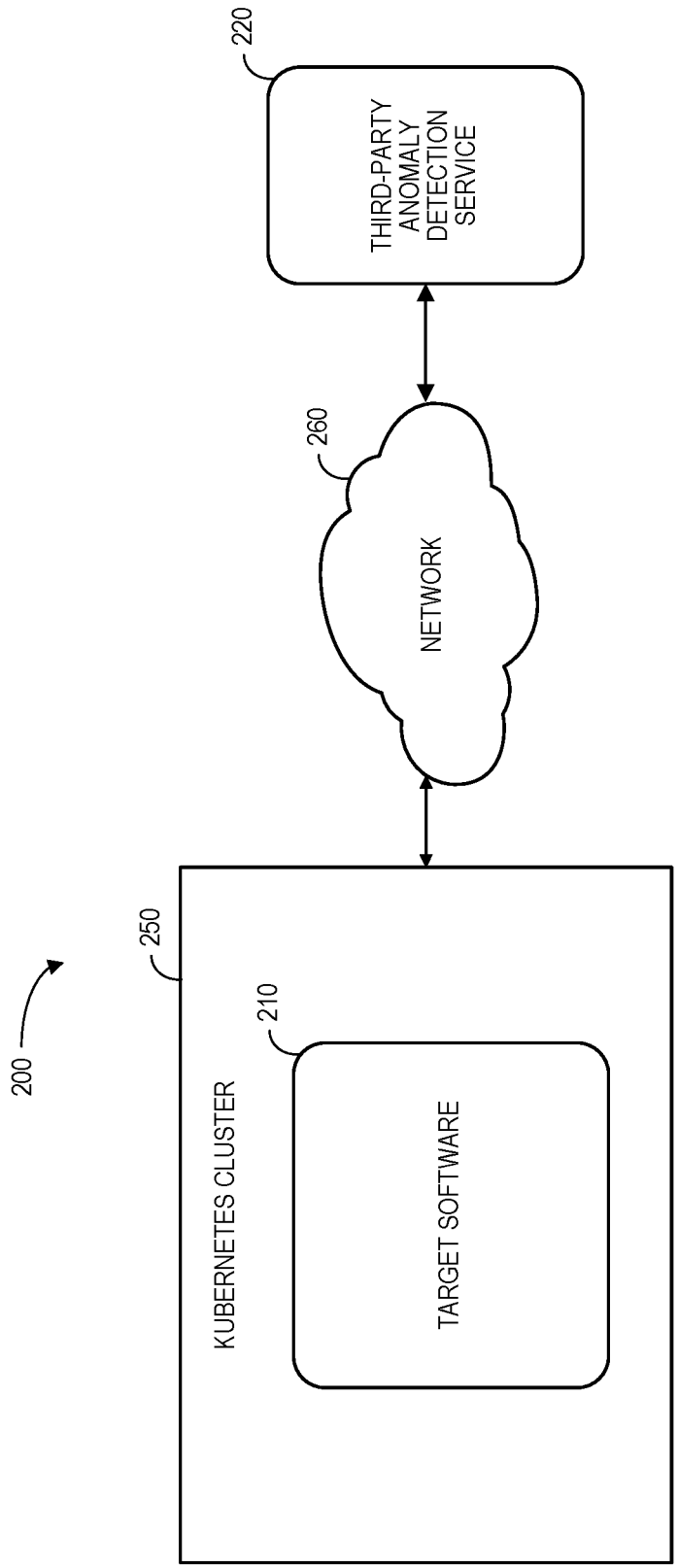
FIG. 2 is another typical approach to anomaly detection in a cloud computing environment.

There are various ways a system might implement anomaly detection for an application being intercepted. For example, FIG. 1 is one typical approach 100 to anomaly detection in a cloud computing environment. Here, target software 110 executing on a Kubernetes cluster 150 may included an anomaly detection component 120 that looks for unusual time-series data values. With this approach 100, however, the target software application 110 will need to implement an anomaly detection framework. Moreover, any changes to that framework (e.g., a new type of data to be intercepted) will require updates to the target software application 110 which can be a time-consuming and error-prone task. FIG. 2 is another typical approach 200 to anomaly detection in a cloud computing environment. In this case, target software 210 executing on a Kubernetes cluster 150 sends information to a remote third-party anomaly detection service 220 via a network 260. With this approach 200, data latency may be introduced due to the network 260 and/or data privacy issues may be a problem.

Figure 3:
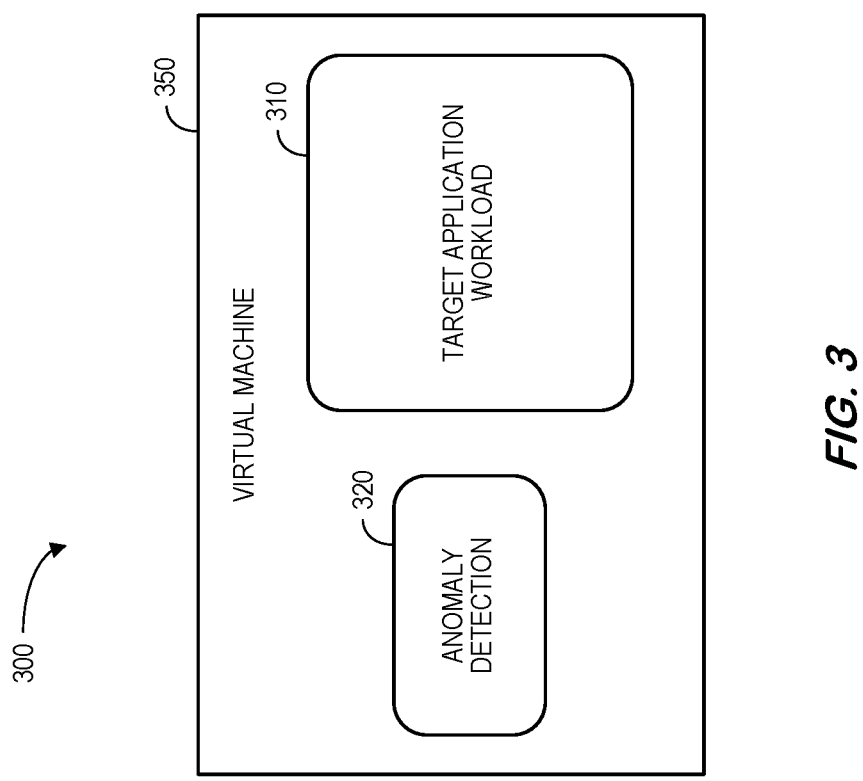
FIG. 3 is a high-level system diagram for anomaly detection in accordance with some embodiments.

FIG. 3 is a high-level system 300 diagram for anomaly detection in accordance with some embodiments. A virtual machine 350 executes a target application workload 310 to be intercepted for anomalies. As used herein, the phrase "virtual machine" may refer to, for example, a system that provides functionality needed to execute in a cloud computing environment. In some case, a hypervisor may share and manage hardware, allowing for multiple environments which are isolated from one another (yet can exist on a single physical machine). An anomaly detection component 320 also executes in the virtual machine 350 to automatically intercept the target application workload 310. A used herein, the term "automatically" may refer to a device or process that can operate with little or no human interaction.

According to some embodiments, devices, including those associated with the system 300 and any other device described herein, may exchange data via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 300 may store data into and/or retrieve data from various data stores (e.g., a storage device), which may be locally stored or reside remote from the virtual machine 350. Although a single virtual machine 350 is shown in FIG. 3, any number of such components may be included (each with its own anomaly detection 320). Moreover, various devices described herein might be combined according to embodiments of the present invention. Some or all of the system 300 functions may be performed by a constellation of networked apparatuses, such as in a distributed processing or cloud-based architecture.

A user (e.g., a cloud operator or administrator) may access the system 300 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to set up or adjust various algorithm parameters) and/or receive automatically generated recommendations, results, and/or alerts from the system 300.

Figure 4:
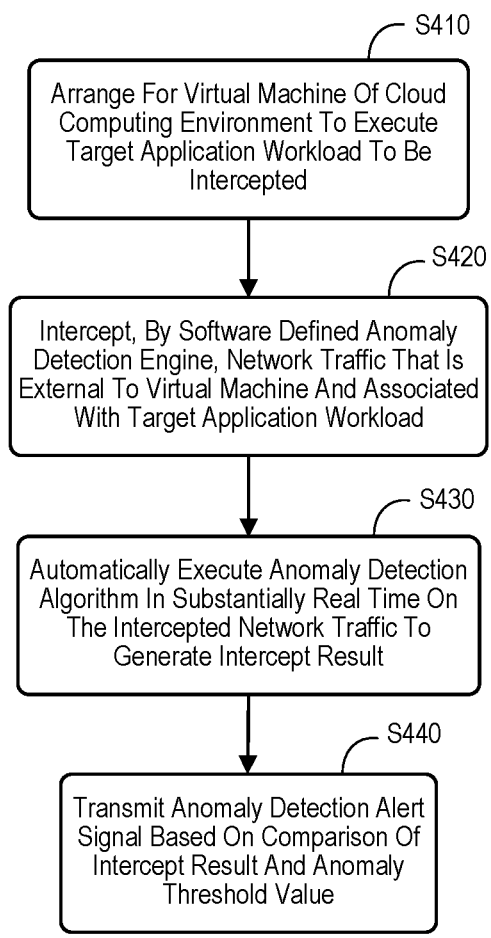
FIG. 4 is a method for anomaly detection according to some embodiments.

FIG. 4 is a method for anomaly detection according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S410, the system may arrange for a virtual machine of a cloud computing environment to execute a target application workload to be intercepted. According to some embodiments, the virtual machine comprises a Kubernetes container-orchestration system cluster. In such cases, the target application workload may be executed via a first pod of the cluster, and a software defined anomaly detection engine may be executed via a second pod of the cluster. In some embodiments, a software defined anomaly detection engine is executed as a side car to the target application workload. Moreover, a virtual machine might be associated with, in some embodiments, a hyperscale computing approach.

At S420, a computer processor of a software defined anomaly detection engine (which is separate from the target application workload and that is also executing in the virtual machine) may be provided to intercept the targe application workload. Moreover, the software defined anomaly detection engine may intercept network traffic (that is external to the virtual machine and associated with the target application workload). In some embodiments, a control plane of the cloud computing environment receives a request to register for anomaly detection and, responsive to the received request, deploys the software define anomaly detection engine to a data plane for the virtual machine. A data plane may then intercept network traffic by identifying information in an incoming data stream.

At S430, an anomaly detection algorithm may be automatically executed, in substantially real time, on the intercepted network traffic to generate an intercept result. According to some embodiments, the anomaly detection algorithm is associated with a spectral residual method. At S440, an anomaly detection alert signal may be transmitted based on a comparison of the intercept result and an anomaly threshold value. According to some embodiments, transmission of the anomaly detection alert may result in an automatic scaling of computing resources for the target application workload (e.g., to add memory, IO capacity, and/or CPU power). In other embodiments, transmission of the anomaly detection alert may result in a notification to a cloud computing environment administrator (e.g., a person or process).

In this way, embodiments may provide a model of software defined anomaly detection which has the following properties:
- an application does not have to deal with creating an anomaly detection framework, etc.,
- anomaly detection happens in substantially real-time, and
- an application does not have to talk to an external service over a network to send data.

Figure 5:
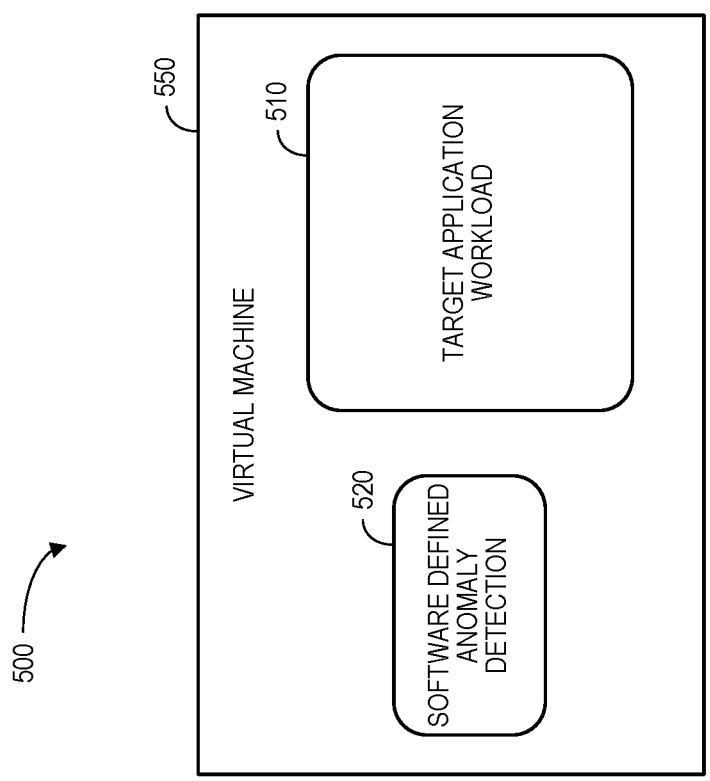
FIG. 5 illustrates software defined anomaly detection in accordance with some embodiments.

FIG. 5 illustrates 500 software defined anomaly detection in accordance with some embodiments. The term "software defined networking" may refer to an approach to network management that enables dynamic, programmatically efficient network configuration in order to improve network performance and intercepting. Similarly, the term "software defined storage" may refer to computer data storage software for policy-based provisioning and management of data storage (independent of the underlying hardware). Embodiments described herein may define a model similar to software defined networking or software defined storage, referred to as "software defined anomaly detection." This phrase may imply that a software defined anomaly detection 520 engine is provisioned on the same virtual machine 550 on which a target application workload 510 is executing. All traffic destined toward the application pod can be routed via this specific anomaly detection engine.

Figure 6:
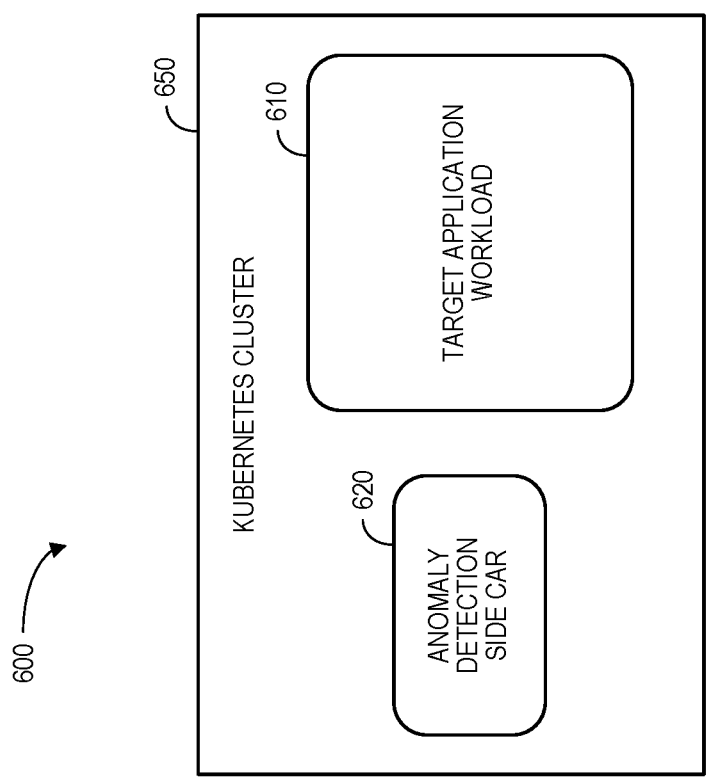
FIG. 6 illustrates side car anomaly detection according to some embodiments.

FIG. 6 illustrates 600 side car anomaly detection according to some embodiments. In this case, an anomaly detection side car 620 engine is provisioned on the same virtual machine 650 on which a target application workload 610 is executing. As used herein, the term "side car" may refer to, for example, a utility container in a pod that is loosely coupled to a main application container (e.g., a side car may help decouple the main business logic from supplementary tasks that extend the original functionality). Embodiments that deploy the anomaly detection engine as a side car 620 can transparently intercept all the traffic which is going towards the application pod (e.g., the target application workload 610). Note that with both approaches (described with respect to FIGS. 5 and 6), anomaly detection is externalized outside of the main target application workload 510, 610 being intercepted.

Figure 7:
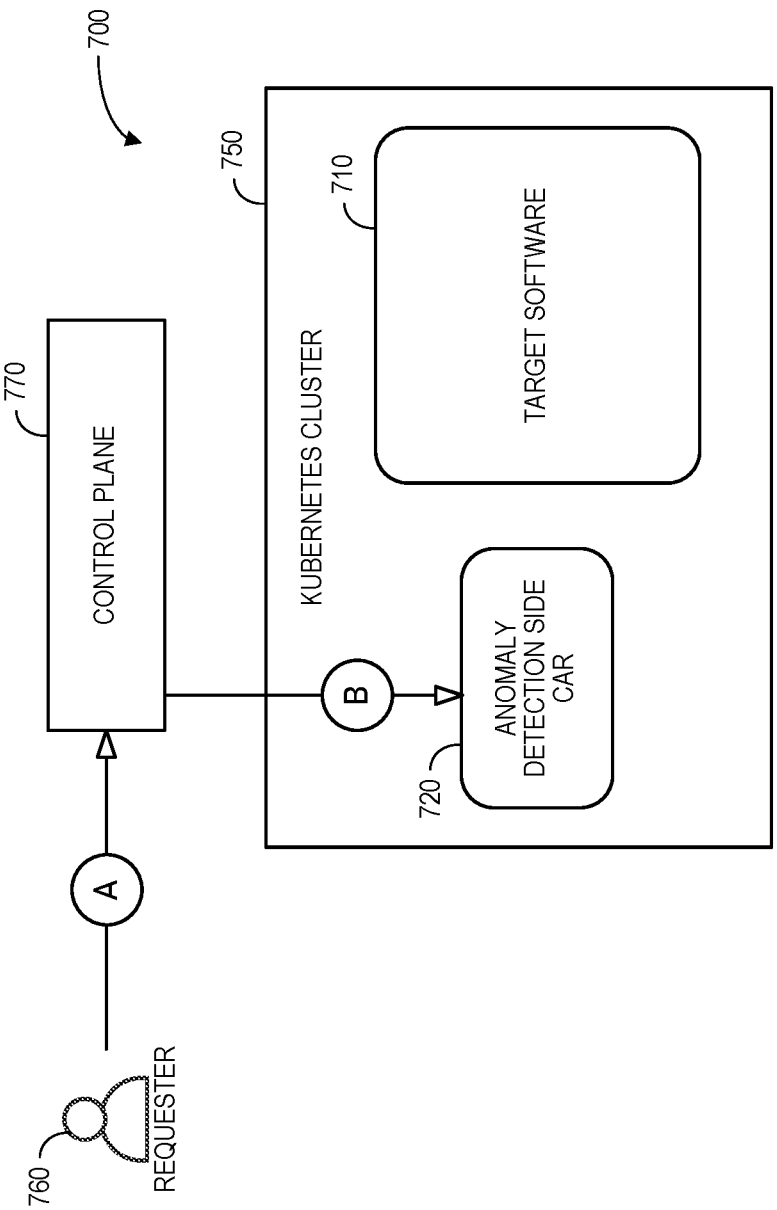
FIG. 7 illustrates control plane components in accordance with some embodiments.

FIG. 7 illustrates 700 control plane components in accordance with some embodiments. At (A), a requester 760 sends a request to register for anomaly detection via a control plane 770. Responsive to the request, at (B) the system deploys an anomaly detection engine or side card 720 to a Kubernetes cluster 750 where a target software 710 to be intercepted is executing. The control plane 770 is responsible for provisioning and deploying the anomaly detection engine either:
- as a side car to the pod which needs anomaly detection, or
- as a separate pod on the virtual machine which intercepts traffic from the pods that need anomaly detection for their traffic (this might be achieved by injecting the target pod IP address into the anomaly detection engine).

Thus, embodiments may setup the engine to start intercepting the data (in a non-intrusive way) and applying anomaly detection online as data is passing through to the actual pod (target software 710). This avoids need of any changes to the existing software to push data to a service externally (which can introduce network costs and latency both in terms of data transfer and anomaly detection).

Figure 8:
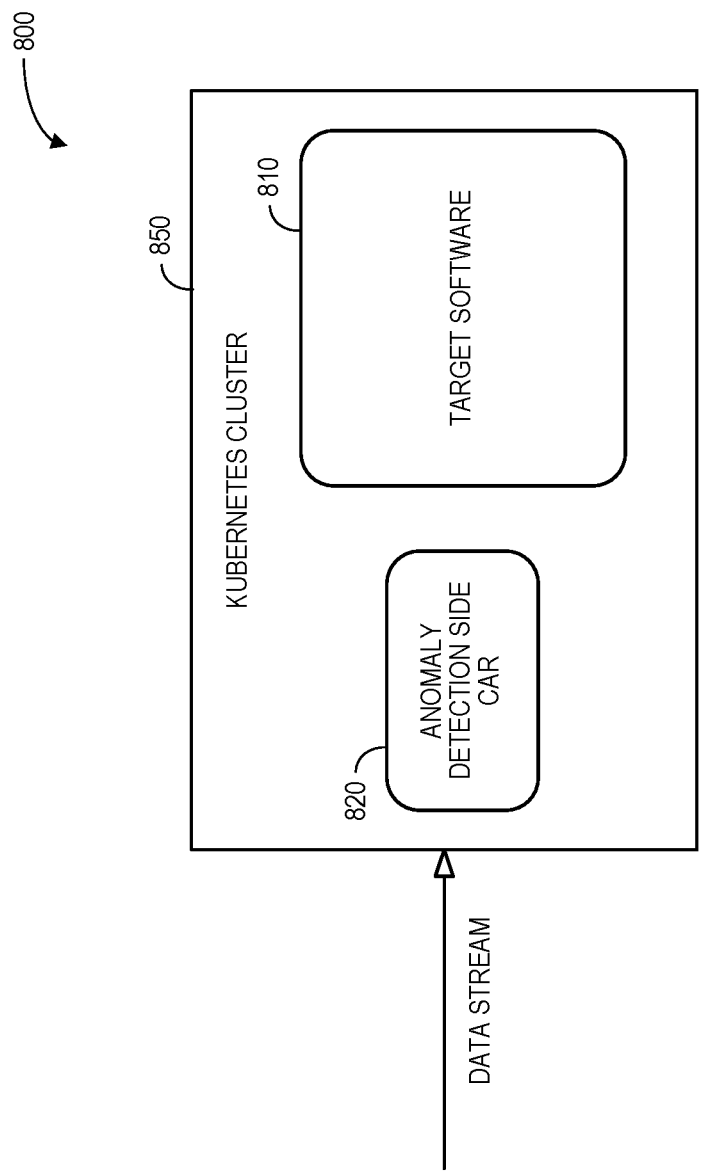
FIG. 8 illustrates data plane components according to some embodiments.

FIG. 8 illustrates 800 data plane components according to some embodiments. As before, a Kubernetes cluster 850 executes both target software 810 to be intercepted and an anomaly detection side car 820 (or a separate pod in the cluster 850). The data plane is the main plane of action. As a data stream passes through, the system runs an online anomaly detector engine (e.g., using an algorithm associated with spectral residual methods). As and when request for a specific software (which is enabled for anomaly detection) is made, the engine intercepts the call and detects patterns of calls. Based on that, the engine decides if there is anomaly in the data stream.

Figure 9:
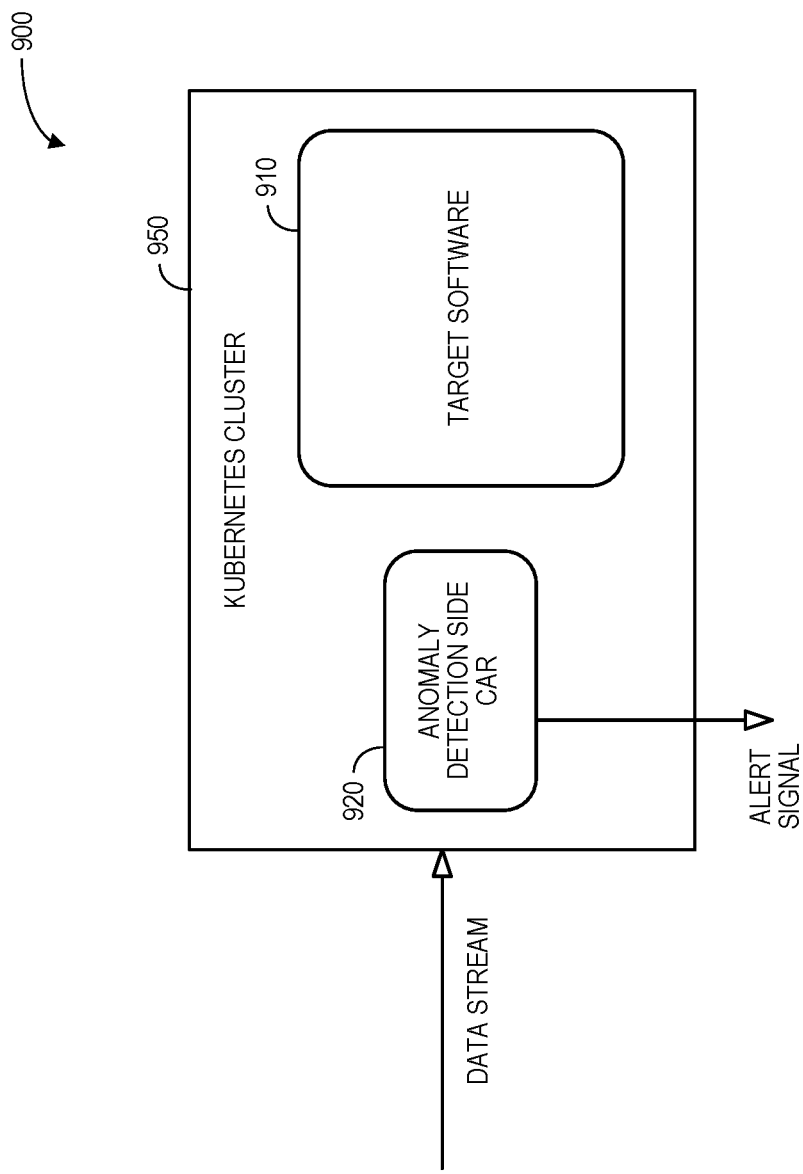
FIG. 9 is a system that provides alerts in accordance with some embodiments.

FIG. 9 is a system 900 that provides alerts in accordance with some embodiments. As before, a Kubernetes cluster 950 executes both target software 910 to be intercepted and an anomaly detection side car 920 (or a separate pod in the cluster 950). When the anomaly detection side car 920 detects an anomaly, an alert signal may be generated. The alert signal may, for example, cause the system 900 to allocate additional computing resources to the target software 910 (e.g., to handle an unusually large number of hits).

Figure 10:
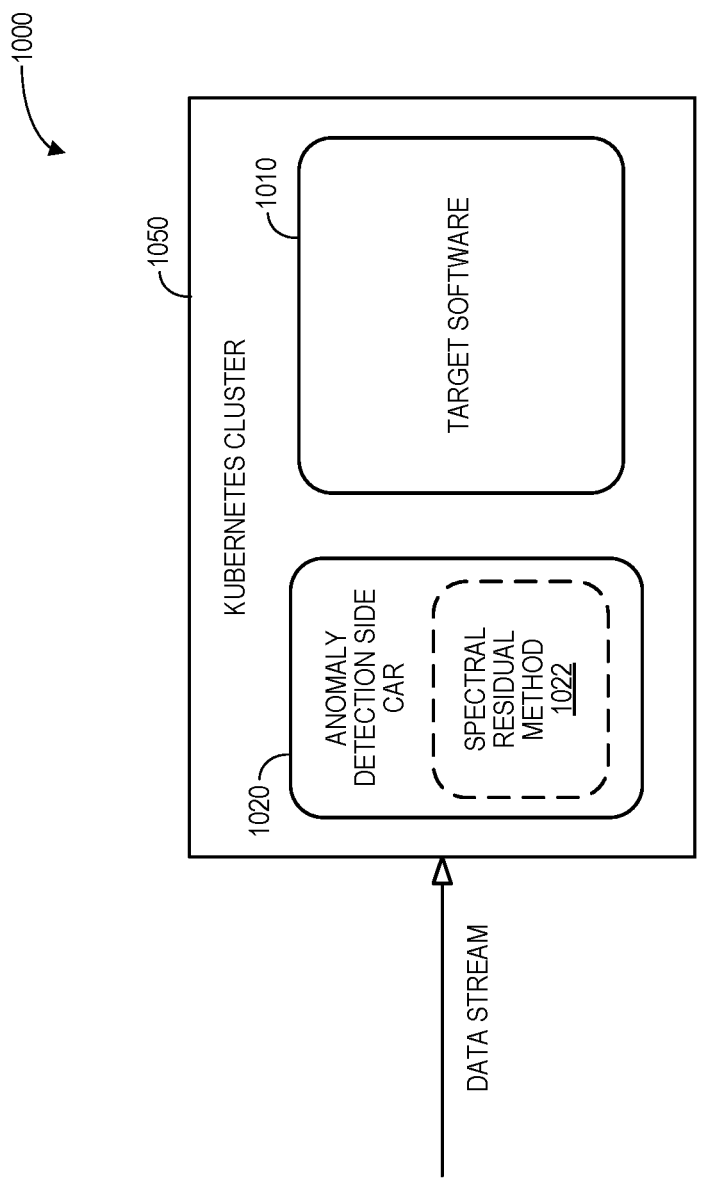
FIG. 10 is a system that utilizes spectral residual methods according to some embodiments.

FIG. 10 is a system 1000 that utilizes spectral residual methods according to some embodiments. As before, a Kubernetes cluster 1050 executes both target software 1010 to be intercepted and an anomaly detection side car 1020 (or a separate pod in the cluster 1050). In this case, the anomaly detection side car 1020 uses a "spectral residual" method 1022 as an anomaly detection algorithm. As used herein, the phrase "spectral residual" may refer to an algorithm that may be suitable for unsupervised online anomaly detection in univariate time-series data. The algorithm first computes the Fourier Transform of the original data and then computes the spectral residual of the log amplitude of the transformed signal before applying the Inverse Fourier Transform to map the sequence back from the frequency domain to the time domain ("the saliency map"). The anomaly score may then be computed as the relative difference between the saliency map values and their moving averages. If the score is above a threshold, the value at a specific timestep may be flagged as an anomaly.

Figure 11:
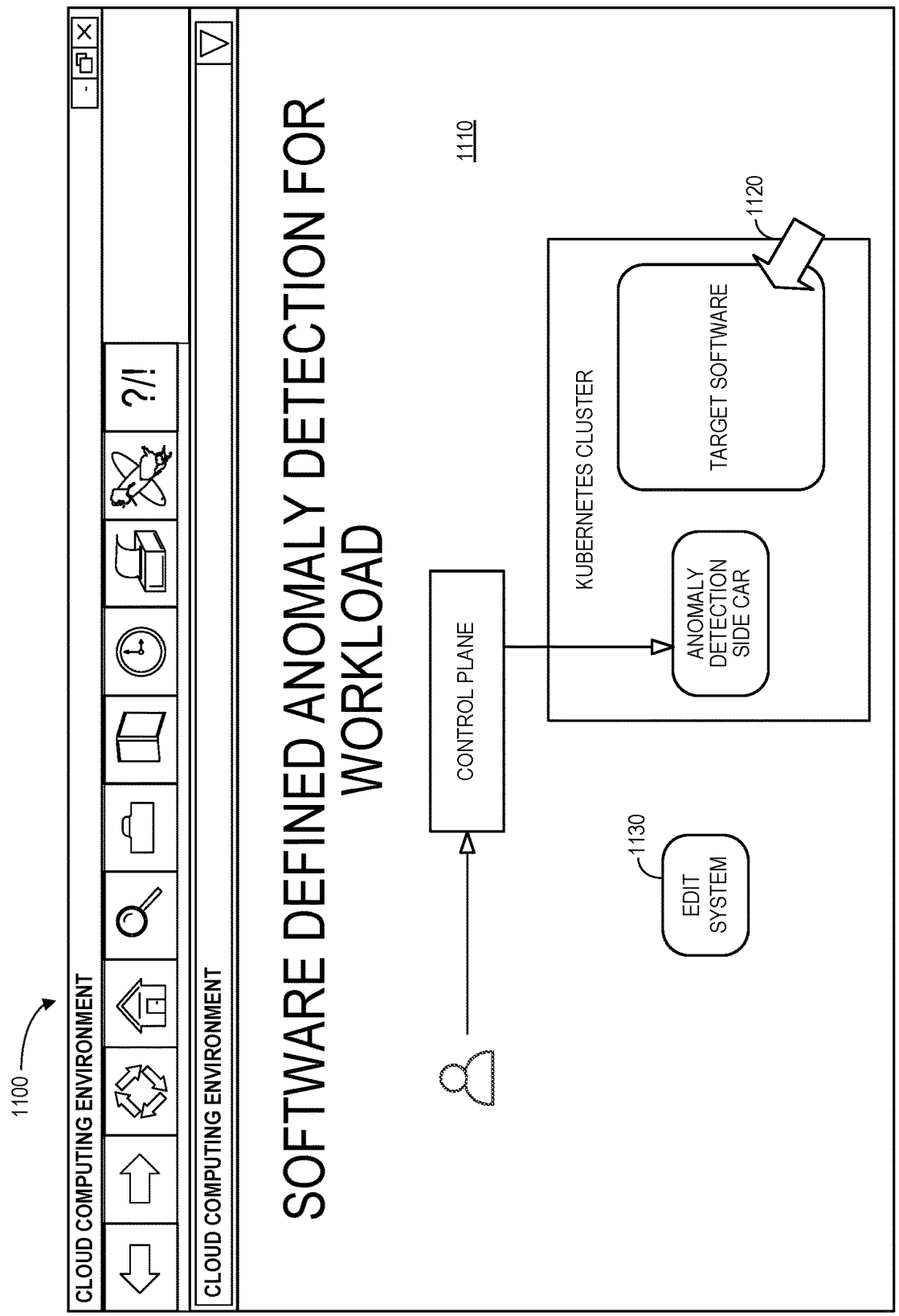
FIG. 11 is a human machine interface display in accordance with some embodiments.

FIG. 11 is a human machine interface display 1100 in accordance with some embodiments. The display 1100 includes a graphical representation 1110 or dashboard that might be used to manage or intercept a software define anomaly detection framework (e.g., associated with a cloud computing environment). In particular, selection of an element (e.g., via a touchscreen or computer mouse pointer 1120) might result in the display of a popup window that contains configuration data. The display 1100 may also include a user selectable "Edit System" icon 1130 to request system changes (e.g., to investigate or improve system performance).

Figure 12:
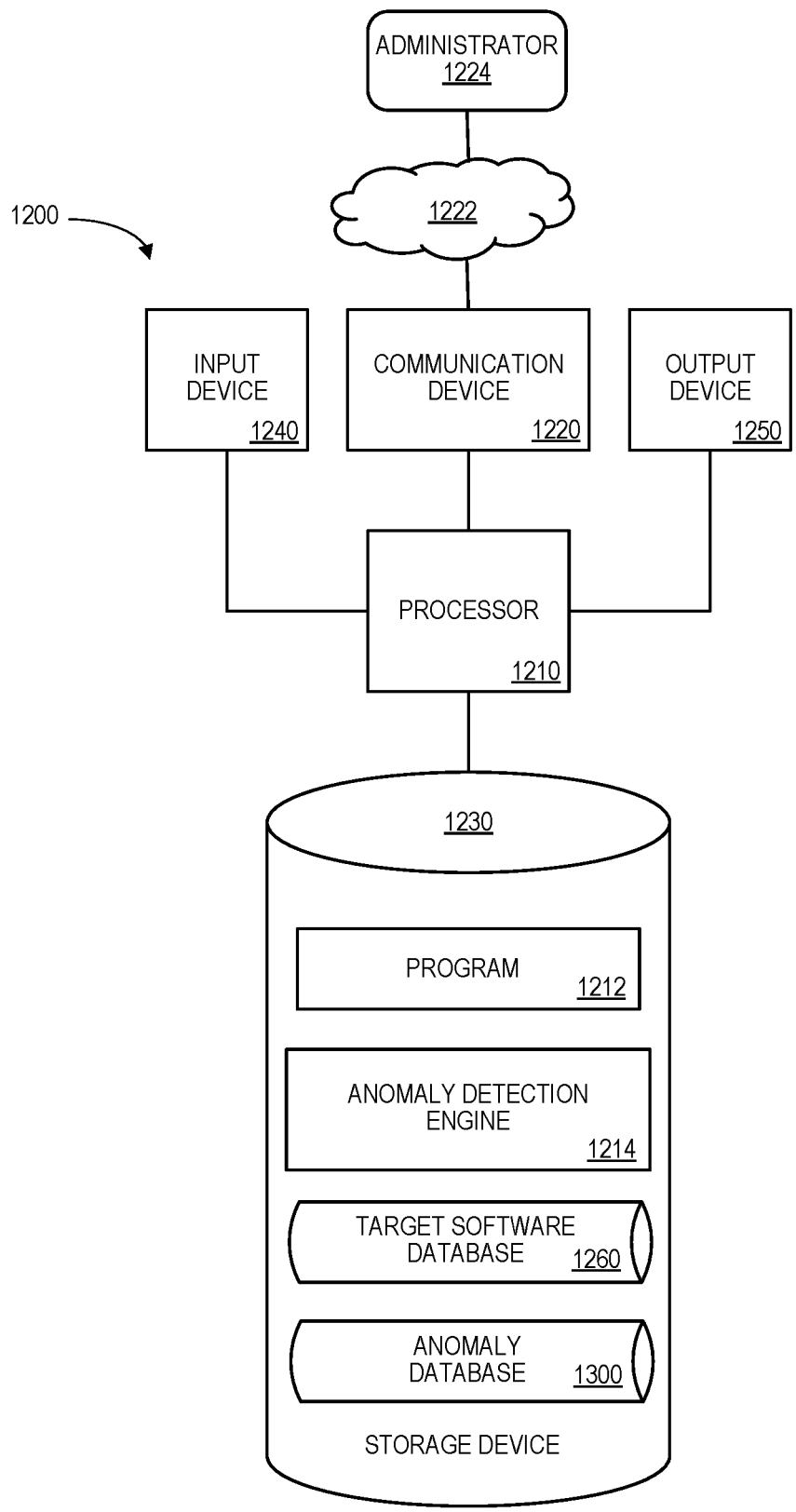
FIG. 12 is an apparatus or platform according to some embodiments.

Note that the embodiments described herein may be implemented using any number of different hardware configurations. For example, FIG. 12 is a block diagram of an apparatus or platform 1200 that may be, for example, associated with the system 300 of FIG. 3 (and/or any other system described herein). The platform 1200 comprises a processor 1210, such as one or more commercially available CPUs in the form of one-chip microprocessors, coupled to a communication device 1220 configured to communicate via a communication network (not shown in FIG. 12). The communication device 1220 may be used to communicate, for example, with one or more remote administrator platforms 1224 (e.g., that intercept application anomalies) via a communication network 1222. The platform 1200 further includes an input device 1240 (e.g., a computer mouse and/or keyboard to input data about model training and/or thresholds) and an output device 1250 (e.g., a computer intercept to render a display, transmit recommendations or alerts, and/or create intercepting reports). According to some embodiments, a mobile device and/or PC may be used to exchange data with the platform 1200.

The processor 1210 also communicates with a storage device 1230. The storage device 1230 can be implemented as a single database or the different components of the storage device 1230 can be distributed using multiple databases (that is, different deployment data storage options are possible). The storage device 1230 may comprise any appropriate data storage device, including combinations of magnetic storage devices (e.g., a hard disk drive), optical storage devices, mobile telephones, and/or semiconductor memory devices. The storage device 1230 stores a program 1212 and/or anomaly detection engine 1214 for controlling the processor 1210. The processor 1210 performs instructions of the programs 1212, 1214, and thereby operates in accordance with any of the embodiments described herein. For example, the processor 1210 may identify a virtual machine, of a cloud computing environment, that executes a target application workload to be intercepted. A software defined anomaly detection engine (that is separate from the target application workload and that is also executing in the same virtual machine) may be connected with the target application workload. The processor 1210 may intercept network traffic that is external to the virtual machine and associated with the target application workload. The processor 1210 may then automatically execute an anomaly detection algorithm in substantially real time on the intercepted network traffic to generate an intercept result. An anomaly detection alert signal may be transmitted by the processor 1210 based on a comparison of the intercept result and an anomaly threshold value.

The programs 1212, 1214 may be stored in a compressed, uncompiled and/or encrypted format. The programs 1212, 1214 may furthermore include other program elements, such as an operating system, clipboard application, a database management system, and/or device drivers used by the processor 1210 to interface with peripheral devices.

As used herein, data may be "received" by or "transmitted" to, for example: (i) the platform 1200 from another device; or (ii) a software application or module within the platform 1200 from another software application, module, or any other source.

In some embodiments (such as the one shown in FIG. 12), the storage device 1230 further stores a target software database 1260 (e.g., identifying applications to be intercepted for anomalies) and an anomaly database 1300. An example of a database that may be used for the platform 1200 will now be described in detail with respect to FIG. 13. Note that the database described herein is only one example, and additional and/or different data may be stored therein. Moreover, various databases might be split or combined in accordance with any of the embodiments described herein.

Figure 13:
FIG. 13 illustrates an anomaly database in accordance with some embodiments.

Referring to FIG. 13, a table is shown that represents the anomaly database 1300 that may be stored at the platform 1200 according to some embodiments. The table may include, for example, entries identifying applications being intercepted in a cloud computing environment. The table may also define fields 1302, 1304, 1306, 1308, 1310 for each of the entries. The fields 1302, 1304, 1306, 1308, 1310 may, according to some embodiments, specify: an anomaly identifier 1302, an application identifier 1304, an anomaly type 1306, a date and time 1308, and a result 1310. The anomaly database 1300 may be created and updated, for example, when a new application is modeled, a new anomaly is detected in the system, etc.

The anomaly identifier 1302 might be a unique alphanumeric label or link that is associated with a particular anomaly that has been detected by the system. The application identifier 1304 might be a unique alphanumeric label or link that is associated with a currently executing application that is being intercepted for anomalies (along with the virtual machine on which application is executing). The anomaly type 1306 may describe the nature of the anomaly (e.g., more or fewer hits as compared to what was expected). The date and time 1308 may indicate when the anomaly occurred. The result 1310 might indicate what action or actions were taken in response to the detection of the anomaly (e.g., adding computer resources, notifying an administrator, etc.).

In this way, embodiments may facilitate software defined anomaly detection for cloud computing environment workloads in an efficient and accurate manner. Since anomaly detection is a broad domain (and can be potentially used for almost all workloads) this way of provisioning anomaly detection can be put to use for many Kubernetes deployments with relatively low overhead. Embodiments may provide for the early detection of anomalies (and allow appropriate for alerting or taking actions) which can be a good business value for a cloud service or application provider.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 14:
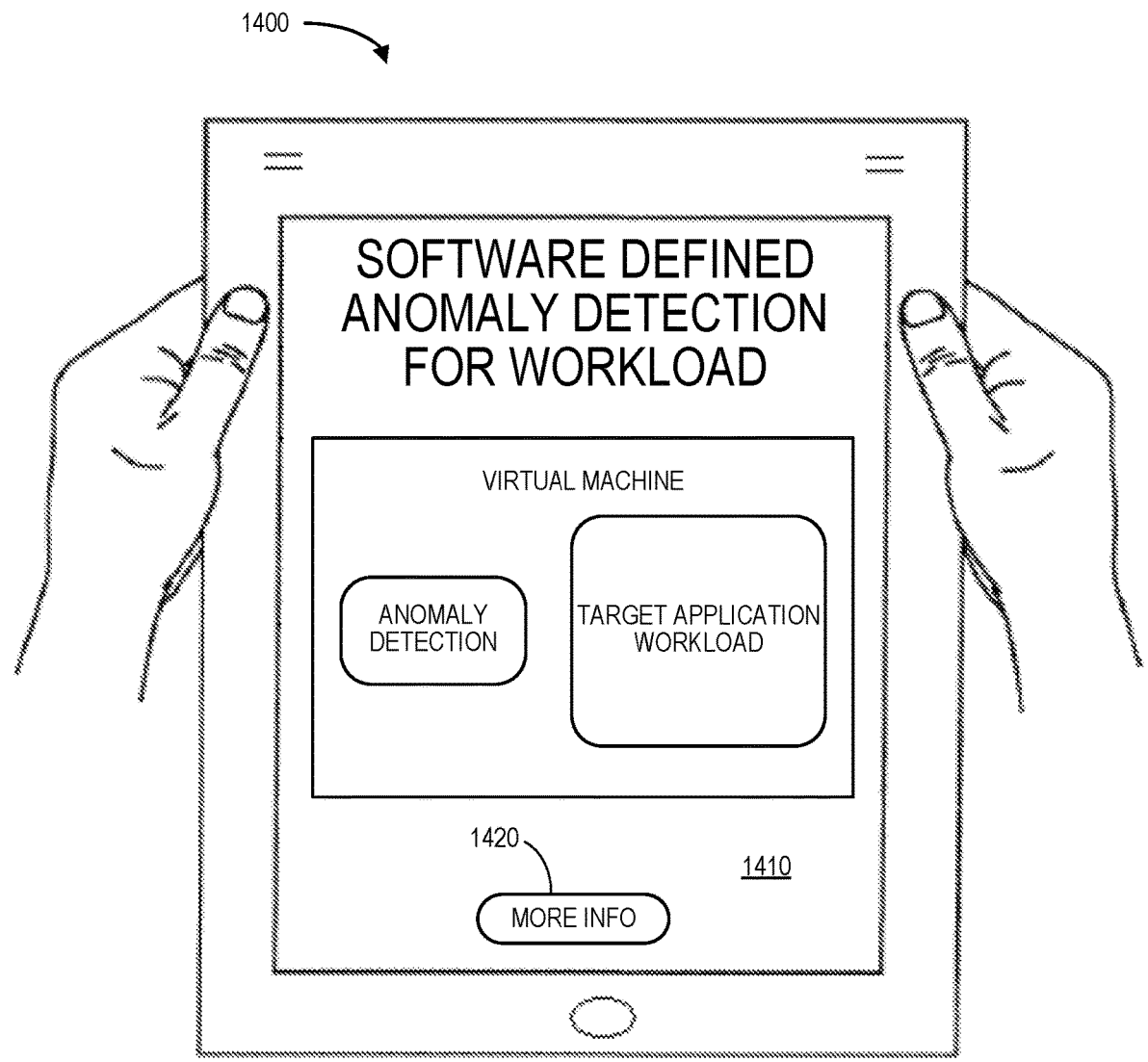
FIG. 14 illustrates a handheld tablet computer according to some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of application anomalies and responses to those anomalies (e.g., restarting an application, adding resources), any of the embodiments described herein could be applied to other types of application anomalies and responses. Moreover, the displays shown herein are provided only as examples, and any other type of user interface could be implemented. For example, FIG. 14 shows a handheld tablet computer 1400 rendering a software defined anomaly detection framework display 1410 that may be used to view or adjust existing system framework components and/or to request additional data (e.g., via a "More Info" icon 1420).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with a cloud computing environment, comprising:
   a Kubernetes container orchestration system cluster of the cloud computing environment executing a target application workload to be intercepted; and
   a software defined anomaly detection engine, that is separate from the target application workload and that is also executing in the Kubernetes container orchestration system cluster, to intercept the target application workload, including:
  a computer processor, and
  a computer memory coupled to the computer processor and storing instructions that, when executed by the computer processor, cause the software defined anomaly detection engine to:
    (i) intercept network traffic that is external to the Kubernetes container orchestration system cluster and associated with the target application workload,
    (ii) automatically execute an anomaly detection algorithm, associated with a spectral residual method, in substantially real time on the intercepted network traffic to generate an intercept result, and
    (iii) transmit an anomaly detection alert signal based on a comparison of the intercept result, patterns of detected calls, and an anomaly threshold value,
  wherein a control plane of the cloud computing environment receives a request to register for anomaly detection and, responsive to the received request, deploys the software defined anomaly detection engine to a data plane for the Kubernetes container orchestration system cluster.

2. The system of claim 1, wherein the target application workload is executed via a first pod of the cluster, and the software defined anomaly detection engine is executed via a second pod of the cluster.

3. The system of claim 1, wherein the software defined anomaly detection engine is executed as a side car to the target application workload.

4. The system of claim 1, wherein the Kubernetes container orchestration system cluster is associated with a hyperscale computing approach.

5. The system of claim 1, wherein the data plane intercepts the network traffic by identifying information in an incoming data stream.

6. The system of claim 1, wherein transmission of the anomaly detection alert results in both: (i) an automatic scaling of computing resources for the target application workload, and (ii) a notification to a cloud computing environment administrator.

7. A computer-implemented method associated with a cloud computing environment, comprising:
  arranging for a Kubernetes container orchestration system cluster of the cloud computing environment to execute a target application workload to be intercepted;
  intercepting, by a computer processor of a software defined anomaly detection engine separate from the target application workload that is also executing in the Kubernetes container orchestration system cluster to intercept the target application workload, network traffic that is external to the Kubernetes container orchestration system cluster and associated with the target application workload;
  automatically executing an anomaly detection algorithm, associated with a spectral residual method, in substantially real time on the intercepted network traffic to generate an intercept result; and
  transmitting an anomaly detection alert signal based on a comparison of the intercept result, patterns of detected calls, and an anomaly threshold value,
  wherein a control plane of the cloud computing environment receives a request to register for anomaly detection and, responsive to the received request, deploys the software defined anomaly detection engine to a data plane for the Kubernetes container orchestration system cluster.

8. The method of claim 7, wherein the target application workload is executed via a first pod of the cluster, and the software defined anomaly detection engine is executed via a second pod of the cluster.

9. The method of claim 7, wherein the software defined anomaly detection engine is executed as a side car to the target application workload.

10. The method of claim 7, wherein the Kubernetes container orchestration system cluster is associated with a hyperscale computing approach.

11. The method of claim 7, wherein the data plane intercepts the network traffic by identifying information in an incoming data stream.

12. The method of claim 7, wherein transmission of the anomaly detection alert results in at least one of: (i) an automatic scaling of computing resources for the target application workload, and (ii) a notification to a cloud computing environment administrator.

13. A system comprising:
  at least one programmable processor; and
  a non-transitory machine-readable medium storing instructions that, when executed by the at least one programmable processor, cause the at least one programmable processor to perform operations associated with a cloud computing environment, including:
    arranging for a Kubernetes container orchestration system cluster of the cloud computing environment to execute a target application workload to be intercepted,
    intercepting, by a computer processor of a software defined anomaly detection engine, that is separate from the target application workload and that is also executing in the cluster to intercept the target application workload, network traffic that is external to the cluster and associated with the target application workload,
    automatically executing an anomaly detection spectral residual algorithm, associated with a spectral residual method, in substantially real time on the intercepted network traffic to generate an intercept result, and
    transmitting an anomaly detection alert signal based on a comparison of the intercept result, patterns of detected calls, and an anomaly threshold value,
    wherein a control plane of the cloud computing environment receives a request to register for anomaly detection and, responsive to the received request, deploys the software defined anomaly detection engine to a data plane for the Kubernetes container orchestration system cluster.

14. The system of claim 13, wherein the target application workload is executed via a first pod of the cluster, and the software defined anomaly detection engine is executed via a second pod of the cluster.

15. The system of claim 13, wherein the software defined anomaly detection engine is executed as a side car to the target application workload.

16. The system of claim 13, wherein transmission of the anomaly detection alert results in both: (i) an automatic scaling of computing resources for the target application workload, and (ii) a notification to a cloud computing environment administrator.

* * * * *